Patented Dec. 26, 1944

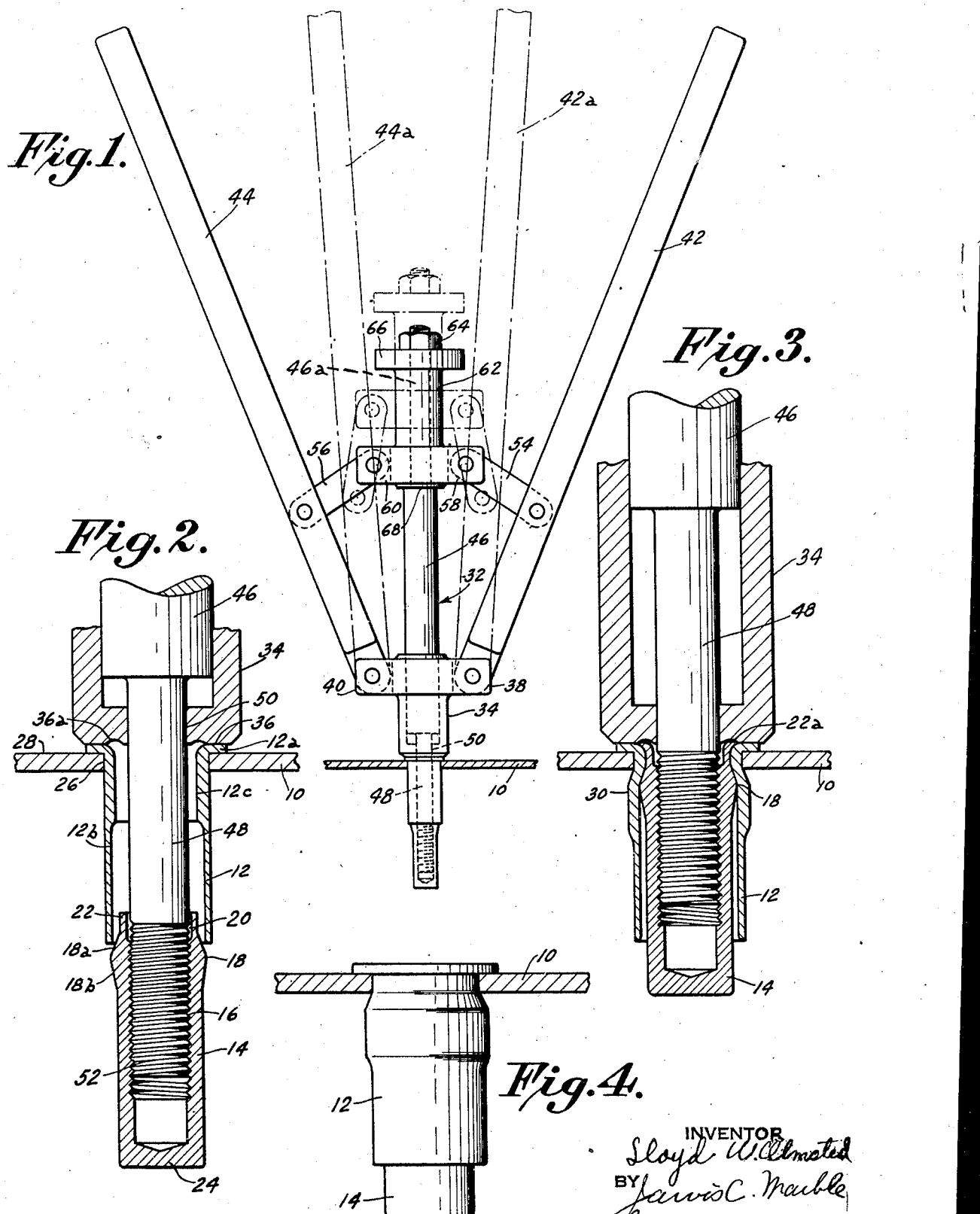

2,365,834

UNITED STATES PATENT OFFICE 2,365,834

FASTENING MEANS

Lloyd W. Olmsted, Hawthorne, Calif.

Application August 3, 1940, Serial No. 350,513

10 Claims. (Cl. 218—29)

The present invention relates to fastening means and has particular reference to screw threaded fastening means for thin plate structures.

Still more particularly the invention refers to screw threaded fastening means providing so-called blind fastenings for cooperation with threaded screws or bolts to be secured to plate structures.

It is frequently desirable, particularly in aircraft construction, to provide means whereby parts may be screw threadedly secured to thin plates of light and relatively soft material such as aluminum or the like, of which the wing and fuselage surfaces of aircraft are usually constructed. The difficulty of making such connections is, however, in the fact that the relatively thin material of the plate structure does not permit formation of a sufficient length of threaded bore to provide adequate holding power for a screw or bolt, and other expedients such as riveting or otherwise permanently securing nuts to such structures have been proposed, through which nuts the screw or bolts are threaded.

A principal object of the present invention is to provide new and improved fastening means particularly suitable for use with thin plate structures and it is a further object of the invention to provide fastening means of the character under consideration that will when applied provide a so-called blind fastening and which further may be applied to a plate structure when the blind or reverse side thereof is not accessible, as, for example, in the case of a closed container or other internally inaccessible structure. A still further object is to provide a novel method of securing fastening means of the character under consideration to a plate or like structure.

The detailed nature of the invention, the manner in which the above mentioned and other objects thereof are attained and the advantages to be derived from its use may best be understood from a consideration of the ensuing portion of this specification in which a fastening device embodying the principles of the invention is described by way of example.

In the accompanying drawing forming a part hereof:

Fig. 1 is a plan view of fastening means embodying the invention, shown in associated relation with a plate structure to which it is to be secured and further in associated relation with the means for effecting its attachment to the plate structure;

Fig. 2 is a section on enlarged scale showing the apparatus in the position illustrated in Fig. 1;

Fig. 3 is a section similar to Fig. 2 showing the apparatus after attachment to the plate structure has been effected; and Fig. 4 is an elevation showing the fastening device in its secured position.

Referring now to the drawing, reference numeral 10 indicates a plate structure to which the fastening device is to be secured.

The fastening device comprises two parts consisting of an anchor member 12 in the form of a sleeve having an outwardly projecting peripheral flange 12a at one end thereof. The second part of the device consists of a tubular member 14 which may conveniently be termed a thread member and which is internally threaded as at 16 and provided with an externally enlarged portion 18 which advantageously is, as shown, in the form of a circumferentially extending bulge having tapered sides 18a and 18b. The bulge 18 is adjacent to but spaced from one end of member 14 and between the bulge and the end of the member the bore 16 is preferably counter-bored as at 20 and the wall around this counter bore made relatively thin to provide an axially extending circumferential lip 22.

In the embodiment illustrated, the member 14 is provided with a bottom portion 24 closing the end of the member remote from the lip 22, but it will be understood that in so far as the broader aspects of the present invention are concerned, member 14 may be in the form of a tube open at both ends and threaded throughout the length of the bore.

As will be observed from Fig. 2, the member 12 is counter-bored at 12b to provide a differential bore the larger end of which is remote from the flanged end of the member. The lip 22 enters the counterbore 12b freely and is also small enough to enter the portion 12c of the bore which is of smaller diameter.

The external diameter of the bulge 18 is appreciably larger than the diameter of the bore portion 12c and may also be slightly larger than the bore portion 12b.

The anchor member 12 advantageously is made of any suitable ductile material capable of being appreciably expanded without fracturing and is ordinarily of light and relatively soft material such as aluminum or the alloys thereof, although it may be of other ductile metals such as brass or copper or even steel, and may in some instances be of ductile non-metallic material. The thread member 14 may be of any material suitable for threading and may in some instances advantageously be of a harder material than that of the anchor member 12 since it may be required to provide screw threads capable of withstanding stresses of substantial magnitude.

As will further be observed from Fig. 2, members 12 and member 14 may readily be inserted through the aperture 26 in plate 10 from the front side thereof, which for the purpose of the present description may be considered as the side indicated by reference number 28.

In order to secure the fastening device in place, the anchoring member 12 and the thread member 14 are placed in relation to each other shown in Fig. 2 with respect to the plate to which the device is to be fastened, with the flange 12a of the anchor member in abutment against the front face of the plate structure.

Thereafter, while the flange 12a of the anchor member is held in closely abutting relation against the face of the plate, the member 14 is drawn toward the plate to the position shown in Fig. 3, to bring the thread member into telescoped relation to the anchor member. When this is done the bulge 18 on the exterior of member 14 operates as a spreading cam to expand at least that part of the tubular portion of the anchor member 12 having the internal bore 12c, to enlarge its diameter and thereby lock the anchor member to the plate in a manner which may be said to be a riveting action, since in effect the expanded portion 30 of the anchor member provides what is in effect a rivet head on the reverse or blind side of the plate. Obviously the counterbore portion 12b may be made longer or shorter than shown, or may be omitted entirely.

While this action is taking place, the flange 12a of anchor member 12 is held against the plate 10 by a suitable abutment member or anvil and an abutment means or anvil is also provided against which the lip 22 of member 14 abuts as the latter member is drawn home, thus spreading or riveting the lip 22 over the end of the anchor member as indicated at 22a in Fig. 3, the riveted-over lip effectively preventing the member 14 from being forced out of the anchor member by pressure applied from the front of the plate. Stated in another way, the riveted-over lip 22 acts to lock the member 14 in assembled relation with respect to the plate and anchor member 12, and the wall of the anchor member, which is now rigidly fixed to the plate, prevents the withdrawal of the member 14 from the front of the plate through the aperture 26, through which member 14 originally may have been inserted.

In describing the foregoing it has been assumed that the plate 10 is not accessible from the reverse or blind side and it will be appreciated that in case the plate is accessible from both sides that both members 12 and 14 need not be inserted through the aperture 26, but that the former may be inserted therethrough and the latter placed, from the reverse side of the plate, in proper position for final assembly.

In order to effect the desired securing of the fastening device to the plate structure, a tool such as that indicated generally at 32 and now to be described is conveniently employed. The tool comprises a head 34 providing an end abutment surface or anvil 36 and having arms 38 and 40 to which operating levers 42 and 44, respectively, are pivotally attached.

Head 34 is slidably mounted on one end portion of a plunger 46 which is provided with a pilot 48 at one end passing through a suitable opening 50 in the end wall of the head 34. The end of the pilot 48 is threaded as at 52 to engage the threaded bore 16 of the thread member 14 of the fastening device.

The operating levers 42 and 44 are connected respectively as by means of pivoted links 54 and 56 to arms 58 and 60 formed on a sleeve-like part 62 secured by means of the nut 64 around a portion 46a of the plunger of reduced diameter remote from the pilot. The plunger 46 is advantageously rotatable within parts 34 and 62 to facilitate unscrewing of the plunger from the member 14 after the riveting operation is completed and for this purpose may have fixed thereto the knurled head 66. The part 62 is held against axial displacement relative to the plunger between the head 66 and the shoulder 68 formed on the plunger.

By means of the above described tool the fastening means is secured to the plate in the following manner: The operating levers 42 and 44 are first spread to the positions shown in solid lines in Fig. 1. When in this position the pilot 48 is projected a substantial distance beyond the head 34 and the anchor member 12 of the fastening device is first placed over the pilot with the flanged end abutting against the face or anvil 36 of the head. The member 14 is then threaded on the end of the pilot projecting beyond the member 12. With the parts of the fastening device thus assembled on the tool, the assembly is then inserted through the opening 26 in the plate and endwise pressure exerted on the tool so as to cause the anvil 36 of the tool head to press the flange 12a against the face of the plate. With the tool in this position, as indicated in Figs. 1 and 2, the operating arms of the tool are then moved together to the dotted line positions shown at 42a and 44a in Fig. 1. Through the action of the links 54 and 56, the plunger, together with the threaded-on member 14, will be pulled toward the plate to effect the desired riveting action for permanently securing the fastening device to the plate. As shown, the anvil 36 is advantageously provided with an annular guide surface 36a to facilitate spreading of lip 22 to the form shown at 22a. It will be understood, of course, that as the operating arms of the tool are moved toward each other, endwise pressure will be maintained on the tool to keep the flange 12a in contact with the face of the plate.

It will be evident that in so far as the fastening device per se is concerned, the specific form of tool above described need not be employed but other means may be resorted to. For example, if both sides of the plate are accessible, it will be evident that the fastening device could be secured to the plate by placing an anvil against flange 12a and driving the member 14 home manually or otherwise by pressure or percussive blows applied to this member from the reverse side of the plate.

It further will be evident that while in most instances, because of ease and cheapness of manufacture, it is preferable to make the parts of the fastening device of symmetrical circular form, the desired locking of the parts to the plate may equally well be secured with the locking portions of the device such as the flange 12a, the bulge 18, and the lip 22 made in the form of circumferentially interrupted or finger-like elements.

While as previously noted, the thread member may be in the form of an open tube, the cup-shaped form is in most instances to be preferred since when it is in this form the fastening device, when secured to a plate, provides a fluid tight construction. As will be evident from the drawing the anchor member may be riveted sufficiently tightly to the plate to provide a fluid tight seal and the lip of the thread member may likewise be riveted to provide a similar seal between the thread and anchor member. With such seals provided by the riveted attachment of the parts it will be apparent that a fluid tight connection is afforded when the thread member is closed at the bottom as in the illustrated embodiment.

When a fluid tight connection is not essential it will be apparent that the tubular portion of the member 12 may be provided with longitudinally extending slits intermediate its ends to facilitate the expanding of this member, but in most instances the expanding is satisfactorily accomplished by circumferential stretching of the metal of the member and this I consider preferable since it eliminates the necessity for an additional slitting operation in the manufacture of the anchor member.

It will be evident that the principles of the invention may be embodied in many different specific forms of device and it is accordingly to be understood that the invention is not limited to the form hereinbefore described by way of example but includes all that may fall within the scope of the appended claims.

What is claimed is:

1. A fastening device of the character described comprising a sleeve-like anchor member adapted to be inserted through an opening in a body to which it is to be attached and having a flange at one end adapted to abut against a surface of said body, and a cooperating threaded member adapted to be telescoped into said anchor member and to expand it to rivet it to said body, said threaded member having a portion adapted to be expanded at the flanged end of the anchor member after the parts are almost completely telescoped to rivet the threaded member against withdrawal from the anchor member.

2. A fastening device of the character described comprising a sleeve-like anchor member adapted to be inserted through an opening in a body to which it is to be attached and having a flange at one end adapted to abut against a surface of said body, and a cooperating threaded member adapted to be telescoped into said anchor member and to expand it to rivet it to said body, said threaded member being of tubular form open at one end and closed at the other end and the open end being adapted to be expanded after the parts are almost completely telescoped to rivet them together.

3. A fastening device of the character described comprising an anchor member of ductile metal, said anchor member comprising a cylindrical sleeve portion and an outwardly projecting flange portion at one end of the sleeve portion, and a cooperating tubular threaded member adapted to be telescoped into said anchor member from the end thereof opposite said flange portion, said threaded member having a portion adjacent to but spaced from one end thereof of larger diameter than the bore of said anchor member, whereby to expand the latter as the parts are telescoped together, and said threaded member further having means at one end thereof adapted to be expanded after passing through the anchor member to secure the parts in telescopically assembled relation.

4. A fastening device of the character described comprising an anchor member of ductile metal, said anchor member comprising a cylindrical sleeve portion and an outwardly projecting flange portion at one end of the sleeve portion, and a cooperating tubular threaded member adapted to be telescoped into said anchor member from the end thereof opposite said flange portion, said threaded member having an axially extending circumferential lip at one end thereof and a circumferentially extending external bulge adjacent said lip, the external diameter of the lip being such as to permit the lip to pass through the bore of the anchor member and the diameter of the bulge being greater than the bore of the anchor member, said bulge acting to expand the tubular portion of the anchor member as the parts are telescoped together and the lip being adapted to be expanded after the parts are almost completely telescoped to lock them in assembled relation.

5. The combination with a plate structure having an aperture therein, of a hollow anchor member extending through said aperture and having a flange contacting one face of the plate, and a hollow threaded member telescoped into said anchor member, the portion of said anchor member on the side of the plate remote from said flange being enlarged to rivet the anchor member to the plate, the end of the threaded member adjacent said flange being riveted over to secure it to the anchor member and the bore of said threaded member being threaded to receive a threaded part.

6. The combination with a plate structure having an aperture therein, of a hollow anchor member extending through said aperture and having a flange contacting one face of the plate, and a hollow threaded member telescoped into said anchor member, the portion of said anchor member on the side of the plate remote from said flange being enlarged to rivet the anchor member to the plate, the end of the threaded member adjacent said flange being riveted over to secure it to the anchor member, the opposite end of said threaded member extending a substantial distance beyond said plate structure and being closed and the bore thereof being threaded to receive a threaded part.

7. The method of securing a screw threaded fastening device to a body provided with an aperture which comprises inserting an externally threaded pilot member through a tubular anchor member having an outwardly flanged end and a tubular portion longer than the thickness of said body, screwing an internally threaded sleeve member having a greater external diameter than the internal diameter of said anchor member onto the end of said pilot member which extends through said anchor member, inserting the aforesaid members through said aperture, maintaining said flange in contact with one face of the body, applying force to said pilot member to telescope the threaded sleeve member into said anchor member from the end opposite the flanged end thereof to expand a portion of the tubular anchor member projecting beyond said body to an external diameter greater than the diameter of said aperture, whereby to rivet it against the face of said body opposite the face with which said flange is in contact, and unscrewing said pilot member from said sleeve member.

8. The method of securing a screw threaded fastening device to an apertured body which comprises inserting through an aperture in said body, an anchor member having a flanged end and a tubular portion substantially longer than the thickness of said body so that the flanged end is in contact with one face of the body and said tubular portion projects substantially beyond the opposite face of the body, telescoping a threaded member having a portion of materially larger external diameter than the bore of said anchor member into the projecting portion of the anchor member to expand said projecting portion to an external diameter materially greater than the diameter of said aperture, whereby to rivet said anchor member to said body, and thereafter outwardly flaring an unthreaded part of said threaded member over said flange to retain the parts in assembled relation.

9. The method of securing a screw threaded fastening device consisting of a tubular anchor member having a flanged end and a threaded member having a threaded bore and a portion of larger diameter than the bore of the anchor member, by the aid of a tool having an anvil part and a threaded pilot part projecting from and relatively movable with respect to the anvil part, which consists in placing said anchor member over said pilot part with the flanged end thereof in abutment against said anvil, threading said threaded member onto said pilot part at the end of the anchor member remote from the flanged end, inserting the pilot part, with the members assembled thereon through an aperture in a body to which the device is to be fastened, retaining the flange in contact with the surface of said body by means of said anvil, and while maintaining the flange in contact with said body drawing the pilot part of the tool and the threaded member toward said anvil to telescope said members and cause the threaded member to expand the anchor member and secure the anchor member to said body by a riveting action, expanding an unthreaded end of the threaded member outwardly against said anvil part to lock the same within said anchor member, and thereafter unscrewing said pilot part from said threaded member.

10. In a screw threaded fastening device adapted be secured within an aperture formed in a plate, a hollow member closed at one end and open at the other adapted to extend through said aperture, a tubular anchor member adapted to be located between said hollow member and the wall of said aperture, a flange extending outwardly from the end of said anchor member adjacent to the open end of said hollow member and adapted to contact one face of said plate, at least a portion of said hollow member near the open end thereof having an outer diameter greater than the inner diameter of a portion of said anchor member adjacent to the opposite face of said plate, and screw threads in said hollow member adapted to be detachably engaged by a threaded rod inserted through the open end of the hollow member for pulling the latter into said anchor member, whereby the last mentioned portion of the anchor member is enlarged to rivet the anchor member to the plate.

LLOYD W. OLMSTED.